Patented Mar. 12, 1935

1,994,170

UNITED STATES PATENT OFFICE 1,994,170

COMPOUND OF THE DISTYRYL PYRIDINIUM SALT SERIES AND ITS PRODUCTION

Martin Dabelow and Alfred Philips, Frankfort-on-the-Main, Germany, assignors to Agfa Ansco Corporation, Binghamton, N. Y., a corporation of New York No Drawing. Application September 4, 1931, Serial No. 561,304. In Germany September 20, 1930

15 Claims. (Cl. 260—42)

Our present invention relates to photographic sensitizers and desensitizers and a process of preparing them.

We have found that compounds of the following formula:

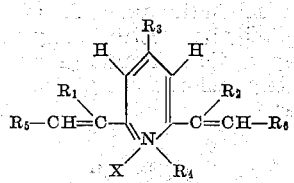

in which $R_1$ and $R_2$ stand for hydrogen or an alkyl group, $R_3$ stands for hydrogen, an aliphatic hydrocarbon group, an aromatic hydrocarbon group of the benzene series or an aliphatic-aromatic hydrocarbon group of the benzyl series, $R_4$ stands for an alkyl or an aliphatic-aromatic hydrocarbon group of the benzyl series, $R_5$ and $R_6$ stand for a phenyl group, a benzyl group or the group $C_6H_5CH=CH-$, the benzene nucleus of which may be substituted by the nitro group, a monoalkylamino group or a dialkylamino group and X stands for a halogen, the group $-SO_4-$ alkyl or the group $-SO_3-$ aromatic hydrocarbons, the aromatic hydrocarbon being of the benzene series may be easily prepared by heating two mols of an aromatic aldehyde the nucleus of which may be substituted by the nitro group, a monoalkylamino group or a dialkylamino group with one mol. of a quaternary salt of the following formula:

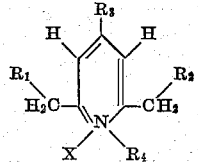

in which $R_1$ and $R_2$ stand for hydrogen or an alkyl group, $R_3$ stands for hydrogen, an aliphatic hydrocarbon group, an aromatic hydrocarbon group of the benzene series or an aliphatic-aromatic hydrocarbon group of the benzyl series, $R_4$ stands for an alkyl or an aliphatic aromatic hydrocarbon group of the benzyl series and X stands for a halogen, the group $-SO_4-$ alkyl or the group $-SO_3-$ aromatic hydrocarbons, the aromatic hydrocarbon being of the benzene series. The reaction may be carried out at temperatures between 50° C. and 100° C. The time required for the complete formation of the final product varies between 4-5 hours and several days according to the constitution of the starting materials used and the temperature applied. When the reaction is complete, the final products can be easily isolated because they crystallize when the reaction mixture is cooled to room temperature. As aromatic aldehydes there may be used: benzaldehyde, cinnamic aldehyde, phenylacetaldehyde, mono-methyl-aminobenzaldehyde, dimethylaminobenzaldehyde, diethyl-amino-cinnamic aldehyde, nitro-benzaldehyde, mono- and di-propylamino-benzaldehyde, β-naphthaldehyde. The substituent may stand in ortho-position as well as in meta-or para-position. As quaternary salts there may be used: the quaternary salts of methyl-iodide, bromide or chloride, ethyl-iodide, propyl-iodide, butyl-iodide, benzyl-iodide, toluene sulfonic acid alkyl ester with 2.6-dimethyl-pyridine, 2.6-diethyl-pyridine, 2.6-dipropyl-pyridine, 2-methyl-6-ethyl-pyridine, 2.4.6-trimethyl-pyridine, 2.6-dimethyl-4-ethyl-pyridine, 2.6-dimethyl-4-phenyl-pyridine, 2.6-dimethyl-4-benzyl-pyridine.

The final products are crystalline compounds, soluble in water and alcohols. They are distinguished by their photographically active character. The compounds, containing a basic substituent such as a mono or dialkyl-amino group in the nuclei $R_1$ and $R_2$ may be used as sensitizers, i. e. they increase the light-sensitiveness of the layers on photographic films, plates and the like to the long-wave rays of the spectrum. The compounds containing negative substituents in the nuclei $R_1$ and $R_2$ for instance the nitro-group, may be used as desensitizers, i. e. they decrease the sensitiveness of photographic layers to the action of light during the development.

The following examples illustrate the invention, but they are not intended to limit it thereto:

1. 1 mol of 2.6-dimethyl-pyridine-ethiodide and 2 mols of 4-dimethylaminobenzaldehyde are dissolved in the absence or presence of alcohol and the solution is heated to 80° C.–100° C. for eight hours or more. There may be added a small quantity of piperidine. The reaction mixture is allowed to cool whereupon the crystals which have separated are isolated and purified by dissolving and recrystallizing them. The final product shows a melting point of 273° C.

2. 2 mols of 4-diethylaminobenzaldehyde and 1 mol of 1.2.4.6-tetramethylpyridinium-bromide are dissolved in the presence or absence of alcohol and heated to 80° C.–100° C. for ten hours or more. There may be added a small quantity of piperidine. The crystals which have been isolated from the cold reaction mixture are purified by dissolving and recrystallizing them.

3. 2 mols of dimethylamino-cinnamic aldehyde and 1 mol of 2.6-dimethylpyridine-ethiodide are dissolved in the presence or absence of an appropriate solvent and heated to 80° C.–100° C. for eight hours or more. There may be added a small quantity of piperidine. The crystals which have separated from the cold reaction mixture are isolated and may be purified by dissolving and recrystallizing them. The final product shows a melting point of 263° C.

4. 2 mols of 3-nitrobenzaldehyde and 1 mol of 1.2.6-trimethylpyridinium-sulfomethylate of the following formula:

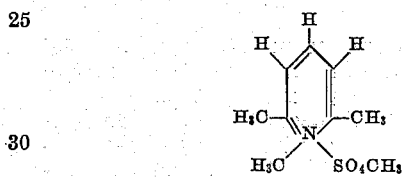

are dissolved in alcohol. A small quantity of piperidine is added to the solution and the whole is boiled for eight hours. The product which has separated from the cold reaction mixture is isolated and may be purified by dissolving and recrystallizing it.

We claim:

1. The process which comprises causing two mols of dimethyl-amino-benzaldehyde to act upon one mol of 2.6-dimethylpyridine-ethiodide at a temperature between 80° C. and 100° C.

2. The compound of the following formula:

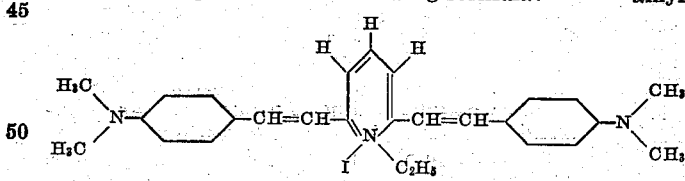

said product being a crystalline substance showing sensitizing properties and being soluble in water and alcohols.

3. The compound of the following formula:

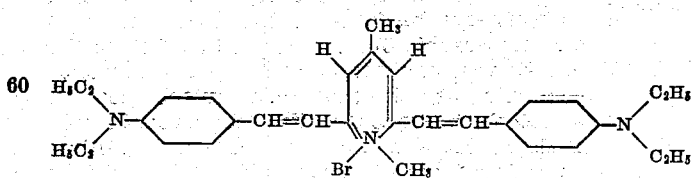

said product being a crystalline substance showing sensitizing properties and being soluble in water and alcohols.

4. The compound of the following formula:

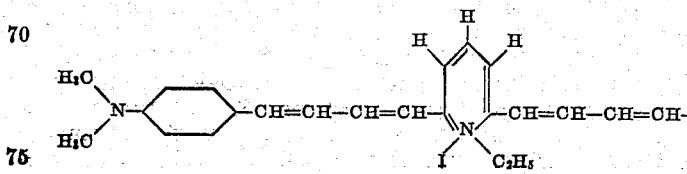

said product being a crystalline substance showing sensitizing properties and being soluble in water and alcohols.

5. The process which comprises heating in the presence of a solvent two mols of an aromatic aldehyde of the benzene series which may be substituted by a mono-alkylamino group, a dialkylamino group or the nitro group with one mol of a compound of the following formula:

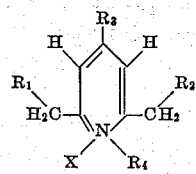

in which $R_1$ and $R_2$ stand for hydrogen or an alkyl group, $R_3$ stands for hydrogen, an aliphatic hydrocarbon group, an aromatic hydrocarbon group of the benzene series or an aliphatic-aromatic hydrocarbon group of the benzyl series, $R_4$ stands for an alkyl or an aliphatic-aromatic hydrocarbon group of the benzyl series and $X$ stands for a halogen, the group —$SO_4$—alkyl or the group —$SO_3$—aromatic hydrocarbon, the aromatic hydrocarbon being of the benzene series.

6. The process which comprises heating two mols of an aromatic aldehyde of the benzene series which may be substituted by a mono-alkylamino group, a dialkylamino group or the nitro group with one mol of a compound of the following formula:

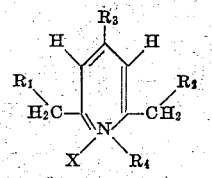

in which $R_1$ and $R_2$ stand for hydrogen or an alkyl group, $R_3$ stands for hydrogen, an aliphatic hydrocarbon group, an aromatic hydrocarbon group of the benzene series or an aliphatic-aromatic hydrocarbon group of the benzyl series, $R_4$ stands for an alkyl or an aliphatic-aromatic hydrocarbon group of the benzyl series, and $X$ stands for Cl, Br or I.

7. The compounds of the following formula:

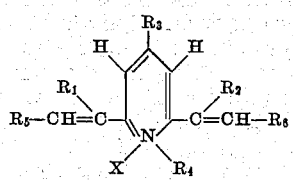

in which $R_1$ and $R_2$ stand for hydrogen or an alkyl group,
$R_3$ stands for hydrogen, an aliphatic hydrocarbon group, an aromatic hydrocarbon group of the benzene series or an aliphatic-aromatic hydrocarbon group of the benzyl series,
$R_4$ stands for an alkyl or an aliphatic-aromatic hydrocarbon group of the benzyl series,
$R_5$ and $R_6$ stand for a phenyl group, a benzyl group or the group $C_6H_5-CH=CH-$, the benzene nucleus of which may be substituted by the nitro group, a monoalkylamino group or a dialkylamino group and
X stands for Cl, Br or I,
said products being crystalline, photographically active substances, soluble in water and alcohols.

8. The compounds of the following formula:

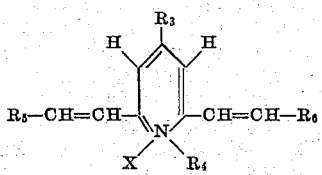

in which
$R_3$ stands for hydrogen, an aliphatic hydrocarbon group, an aromatic hydrocarbon group of the benzene series or an aliphatic-aromatic hydrocarbon group of the benzyl series,
$R_4$ stands for an alkyl or an aliphatic-aromatic hydrocarbon group of the benzyl series.
$R_5$ and $R_6$ stand for a residue of the benzene group which may contain a mono-alkylamino group, a dialkylamino group or the nitro group and
X stands for Cl, Br or I,
said products being crystalline, photographically active substances, soluble in water and alcohols.

9. The compounds of the following formula:

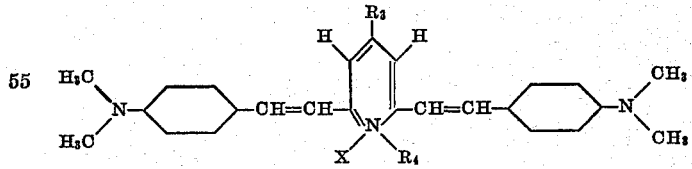

in which
$R_3$ stands for hydrogen, an aliphatic hydrocarbon group, an aromatic hydrocarbon group of the benzene series or an aliphatic-aromatic hydrocarbon group of the benzyl series,
$R_4$ stands for an alkyl or an aliphatic-aromatic hydrocarbon group of the benzyl series.
and X stands for Cl, Br or I,
said products being crystalline substances showing sensitizing properties and being soluble in water and alcohols.

10. The process which comprises heating two mols of an aromatic aldehyde of the benzene series which may be substituted by a mono-alkylamino group, a dialkylamino group or the nitro group with one mol of a compound of the following formula:

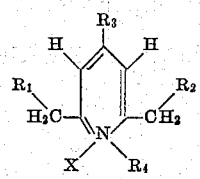

in which
$R_1$ and $R_2$ stand for hydrogen or an alkyl group,
$R_3$ stands for hydrogen, an aliphatic hydrocarbon group, an aromatic hydrocarbon group of the benzene series or an aliphatic-aromatic hydrocarbon group of the benzyl series,
$R_4$ stands for an alkyl or an aliphatic-aromatic hydrocarbon group of the benzyl series and
X stands for a halogen, the group $-SO_4-$ alkyl or the group $-SO_3-$ aromatic hydrocarbon, the aromatic hydrocarbon being of the benzene series.

11. The process which comprises heating two mols of an aromatic aldehyde of the benzene series which may be substituted by a mono-alkylamino group, a dialkylamino group or the nitro group with one mol of a compound of the following formula:

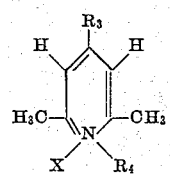

in which
$R_3$ stands for hydrogen, an aliphatic hydrocarbon group, an aromatic hydrocarbon group of the benzene series or an aliphatic-aromatic hydrocarbon group of the benzyl series,
$R_4$ stands for an alkyl or an aliphatic-aromatic hydrocarbon group of the benzyl series and
X stands for a halogen, the group $-SO_4-$ alkyl or the group $-SO_3-$ aromatic hydrocarbon, the aromatic hydrocarbon being of the benzene series.

12. The process which comprises heating two mols of benzaldehyde, which may be substituted by a mono-alkylamino, a dialkylamino group or the nitro group with one mol of a compound of the following formula:

in which
$R_3$ stands for hydrogen, an aliphatic hydrocarbon group, an aromatic hydrocarbon group of the benzene series or an aliphatic-aromatic hydrocarbon group of the benzyl series,
$R_4$ stands for an alkyl or an aliphatic-aromatic hydrocarbon group of the benzyl series and X stands for a halogen, the group —SO₄— alkyl or the group —SO₃— aromatic hydrocarbon, the aromatic hydrocarbon being of the benzene series.

13. The compounds of the following formula:

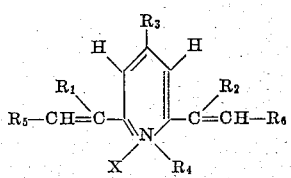

in which
R₁ and R₂ stand for hydrogen or an alkyl group,
R₃ stands for hydrogen, an aliphatic hydrocarbon group, an aromatic hydrocarbon group of the benzene series or an aliphatic-aromatic hydrocarbon group of the benzyl series,
R₄ stands for an alkyl or an aliphatic-aromatic hydrocarbon group of the benzyl series,
R₅ and R₆ stand for a phenyl group, a benzyl group or the group C₆H₅—CH=CH-, the benzene nucleus of which may be substituted by the nitro group, a monoalkylamino group or a dialkylamino group and
X stands for a halogen, the group —SO₄-alkyl or the group —SO₃-aromatic hydrocarbon, the aromatic hydrocarbon being of the benzene series,
said products being crystalline, photographically active substances, soluble in water and alcohols.

14. The compounds of the following formula:

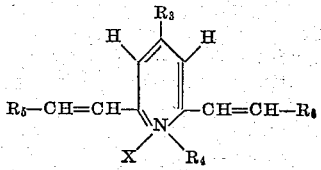

in which

R₃ stands for hydrogen, an aliphatic hydrocarbon group, an aromatic hydrocarbon group of the benzene series or an aliphatic-aromatic hydrocarbon group of the benzyl series,
R₄ stands for an alkyl or an aliphatic-aromatic hydrocarbon group of the benzyl series,
R₅ and R₆ stand for a phenyl group, a benzyl group or the group C₆H₅—CH=CH-, the benzene nucleus of which may be substituted by the nitro group, a monoalkylamino group or a dialkylamino group and
X stands for a halogen, the group —SO₄-alkyl or the group —SO₃-aromatic hydrocarbon, the aromatic hydrocarbon being of the benzene series,
said products being crystalline, photographically active substances, soluble in water and alcohols.

15. The compounds of the following formula:

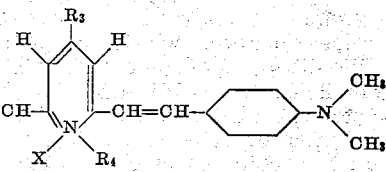

in which
R₃ stands for hydrogen, an aliphatic hydrocarbon group, an aromatic hydrocarbon group of the benzene series or an aliphatic-aromatic hydrocarbon group of the benzyl series,
R₄ stands for an alkyl or an aliphatic-aromatic hydrocarbon group of the benzyl series and
X stands for a halogen, the group —SO₄-alkyl or the group —SO₃-aromatic hydrocarbon, the aromatic hydrocarbon being of the benzene series,
said products being crystalline substances showing sensitizing properties and being soluble in water and alcohols.

MARTIN DABELOW.
ALFRED PHILIPS.